Dec. 2, 1952  H. WÜSTER  2,620,210

CONNECTOR FOR TELESCOPING TUBULAR STICK MEMBERS

Filed April 4, 1950

*INVENTOR.*
HEINRICH WÜSTER
BY

Patented Dec. 2, 1952

2,620,210

UNITED STATES PATENT OFFICE 2,620,210

CONNECTOR FOR TELESCOPING TUBULAR STICK MEMBERS

Heinrich Wüster, Imst, Tirol, Austria

Application April 4, 1950, Serial No. 153,829
In Austria April 11, 1949

5 Claims. (Cl. 287—58)

1

The invention relates to latch mechanisms or connectors for telescoping tubular stick members, suitable, for instance, for camera tripods, collapsible umbrellas, or similar articles.

Desirable features of releasable latch mechanisms or connectors for telescoping elements include simple and safe latching facility and easy unlatching, and these features generally are found in latch mechanisms of this type now in use. However, present mechanisms are deficient in that the latch usually slides on, and frictionally engages, one of the telescoping elements when one element is moved relative to the other; this subjects either the latch, or the element engaged thereby, or both, to continual wear, and considerably shortens the useful lifetime of the parts involved.

It is therefore among the objects of the invention, to provide a latch mechanism that will securely lock the telescoping elements in an active position of the latch, and restrain friction between the latch and any other part moving relative thereto when the latch is in inactive position. In accordance with the invention, this is accomplished by providing a roller member that is in rolling, non-frictional contact with the moving telescoping element while being in inactive position, and by the provision of means on the telescoping elements, enabling the roller member to latch the elements securely, though releasably, in the active locking position.

With the above and other objects of the invention in view, the invention consists in the novel construction, arrangement and combination of various devices, elements and parts, as set forth in the claims hereof, certain embodiments of the same being illustrated in the accompanying drawings and described in the specification.

In the accompanying drawings.

2

Figure 1:
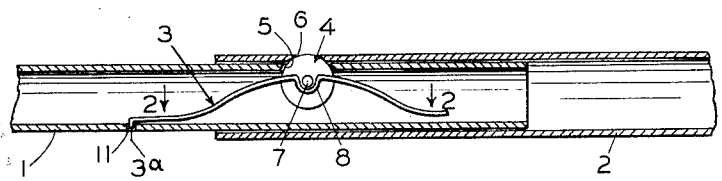
Fig. 1 is a longitudinal sectional view of a latching mechanism, shown in locking position, in accordance with the invention.
Figure 2:
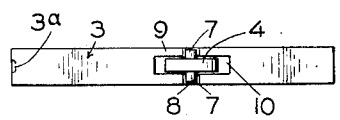
Fig. 2 is an elevational view of the latch and support thereof, as seen along line 2—2 of Fig. 1.
Figure 3:
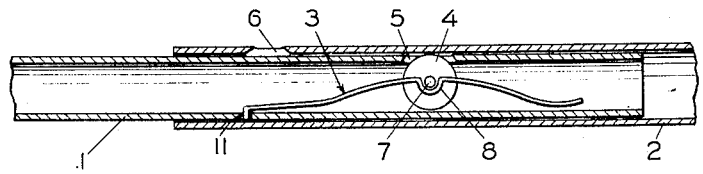
Fig. 3 is a longitudinal sectional view of the mechanism shown in Fig. 1, but illustrating the inactive position.

In carrying the invention into effect in the embodiments which have been selected for illustration in the accompanying drawings and for description in this specification, and referring now particularly to Figs. 1, 2 and 3, there is provided an inner telescoping element, such as a sleeve 1, and an outer telescoping element, for instance a sleeve 2, that is slidable relative to the inner sleeve 1.

A rolling member, or roller, generally indicated at 4, is carried in said inner sleeve 1, by a resilient support, such as a leaf spring 3, that is connected to the inner sleeve 1 by means of a hook 3a held in a slot 11 of the inner sleeve. The said support or carrier 3 and the roller 4, owing to the connection of the carrier to the inner sleeve, take part in the longitudinal movement of said sleeve 1 relative to the outer sleeve 2.

The inner sleeve has an aperture 5 and the outer sleeve an aperture 6, and in one position, namely the active locking position of the sleeve there will be registry between the apertures; in all other sleeve positions, however, the apertures will be offset against each other. The aperture 5 of the inner sleeve 1 is larger than the aperture 6 of the outer sleeve 2, and the contours of the apertures are essentially rectangular so formed that in the position of registry, when the roller 4 will be pressed by the resilient support 3 to project into both, the roller will be closely surrounded by the edges of the apertures, thereby causing interlocking of the sleeves.

In the embodiment shown in Figs. 1–3, the roller 4 is provided with two opposite, aligned pintles 7 that are journaled in corresponding depressions 8 that are formed in lugs 9 of the leaf spring carrier 3, and the roller extends through a slot 10 formed between the lugs 9, whereby it is restrained from lateral shifting.

Figure 4:
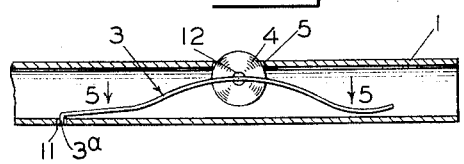
Fig. 4 is a longitudinal sectional view, similar to Fig. 1, but embodying a modification and, for the purpose of simplicity, omitting the outer telescoping sleeve element.
Figure 5:
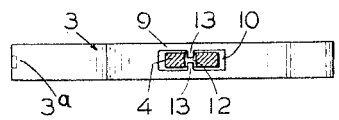
Fig. 5 is an elevational view similar to Fig. 2, but illustrating the modified latch and support shown in the preceding view, as seen along line 5—5 of Fig. 4.

In the modification illustrated in Figs. 4 and 5, the roller has a central bore 12, and the lugs 9 that define the width of the slot 10, carry two oppositely disposed extensions 13 that face each other and which project into the bore to support the roller turnably.

The carrier 3 resiliently urges the roller 4 in a direction transverse to the longitudinal extension of the sleeves, and axially of the aperture 4, towards the active position of projection into, and engagement by the edges of, both apertures. When the apertures are off-set, however, as best shown in Fig. 3, the carrier will press the roller 4 into the aperture 5 of the inner sleeve 1, but further outward movement in that position is restrained by the inner surface of the outer sleeve 2 that provides an abutment for the periphery of the roller 4. The roller is thus in rolling contact with that surface, enabling the sleeves to slide against each other without the occurrence of slide-friction between the roller and the outer sleeve.

Since the aperture 5 of the inner sleeve 1 is larger than that portion of the roller which at latching would be engaged by the aperture 6 of the outer sleeve 2, but only that very portion is disposed in the larger aperture 5 in the inactive position there will be no frictional contact between the roller and the edges of the aperture 5 and hence the roller is enabled easily to turn accordingly when the telescoping elements move relative to each other. This is best shown in Fig. 3.

The operation of the above described embodiments is as follows:

The leaf spring or other resilient support 3 urges the roller 4 into a position where it extends into the aperture 5 of the inner sleeve 1 to which the leaf spring is connected. At nonregistry of the apertures, the roller is in rolling contact with the interior of the outer sleeve. When the apertures are in registry, the spring will press the roller into engagement with both apertures, and the edges of the apertures will closely surround the roller; thereby, the sleeves will be releasably interlocked. Upon application of a sliding force to the sleeves above a certain critical force, however, the oblique edges of the aperture 6 will move the roller 4 against the power of the leaf spring 3, and thus the sleeves will be unlatched.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

Having thus described the invention, what I claim as new and desire to be secured by Letters Patent, is as follows:

1. A connector for telescoping tubular stick members particularly in umbrella frames comprising in combination a resilient support attached to the inner stick member inside thereof, a roller mounted upon said support within said inner stick member to rotate about an axis perpendicular to the longitudinal axis of said stick member, an essentially rectangular first aperture in said inner stick member, said roller partially protruding through said first aperture and an essentially rectangular second aperture in the outer stick member arranged to register with said first aperture and adapted to receive the protruding portion of said roller when said apertures register with each other.

2. A connector for telescoping tubular stick members particularly in umbrella frames comprising in combination a leaf spring longitudinally extending in the inner stick member and secured therein against displacement in axial direction thereto, a roller mounted upon said leaf spring within said inner stick member to rotate about an axis perpendicular to the longitudinal axis of said stick member, an essentially rectangular first aperture in said inner stick member, said roller partially protruding through said first aperture, and an essentially rectangular second aperture in the outer stick member arranged to register with said first aperture and adapted to receive the protruding portion of said roller when said apertures register with each other.

3. A connector for telescoping tubular stick members particularly in umbrella frames comprising in combination a leaf spring longitudinally extending in the inner stick member and secured therein against displacement in axial direction thereto, a slot in said leaf spring, a roller mounted upon said leaf spring to rotate within said slot about an axis perpendicular to the longitudinal axis of said stick member, an essentially rectangular first aperture in said inner stick member, said roller partially protruding through said first aperture, and an essentially rectangular second aperture in the outer stick member arranged to register with said first aperture and adapted to receive the protruding portion of said roller when said apertures register with each other.

4. A connector according to claim 2 wherein the roller is provided with axial studs and the leaf spring with recesses to receive and to rotatably support said studs.

5. A connector according to claim 2 wherein the roller is provided with a central bore and the leaf spring with projections engaging said bore to rotatably support said roller.

HEINRICH WÜSTER.

REFERENCES CITED

The following references are of record in the file of this patent:

UNITED STATES PATENTS

| Number | Name | Date |
| --- | --- | --- |
| 1,457,964 | Doty | June 5, 1923 |
| 2,187,372 | Capaldo | Jan. 16, 1940 |
| 2,473,388 | Rambo | June 14, 1949 |
| 2,474,360 | Jimerson | June 28, 1949 |